United States Patent
Taki et al.

(10) Patent No.: US 12,067,383 B2
(45) Date of Patent: Aug. 20, 2024

(54) PROGRAM UPDATE CONTROL APPARATUS, PROGRAM UPDATE CONTROL METHOD, AND COMPUTER-READABLE STORAGE MEDIUM

(71) Applicant: HONDA MOTOR CO., LTD., Tokyo (JP)

(72) Inventors: Tomoaki Taki, Tokyo (JP); Yosuke Shionoya, Tokyo (JP); Naoya Hayashida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 17/681,828

(22) Filed: Feb. 27, 2022

(65) Prior Publication Data
US 2022/0300272 A1    Sep. 22, 2022

(30) Foreign Application Priority Data
Mar. 19, 2021  (JP) .................................. 2021-046133

(51) Int. Cl.
*G06F 9/44* (2018.01)
*B60W 50/06* (2006.01)
(Continued)

(52) U.S. Cl.
CPC .............. *G06F 8/65* (2013.01); *B60W 50/06* (2013.01); *B60W 50/14* (2013.01); *B60W 2510/242* (2013.01)

(58) Field of Classification Search
None
See application file for complete search history.

(56) References Cited

U.S. PATENT DOCUMENTS

| 10,241,807 B2* | 3/2019 | Nakahara ................ G06F 8/654 |
| 2012/0047375 A1* | 2/2012 | Hashimoto ............. G06F 8/654 |
| | | 713/300 |

(Continued)

FOREIGN PATENT DOCUMENTS

| JP | 2019036140 A | 3/2019 |
| JP | 2020027666 A | 2/2020 |
| JP | 2020135578 A | 8/2020 |

OTHER PUBLICATIONS

Office Action issued for counterpart Japanese Application No. 2021-046133, issued by the Japanese Patent Office on Jan. 31, 2023 (drafted on Jan. 23, 2023).

*Primary Examiner* — Qamrun Nahar

(57) ABSTRACT

A program update control apparatus comprises a rewriting control unit for performing control over rewriting of a program executed by a mobile object control unit for controlling at least part of a mobile object with a new program, a retrieving unit for retrieving information related to the new program and a power amount required for the rewriting from an external apparatus, and a power source information retrieving unit for retrieving a remaining capacity of a battery of the mobile object used for the rewriting, wherein the rewriting control unit starts the rewriting based on information related to a power amount required for the rewriting, the power source information retrieving unit retrieves a remaining capacity of the battery during the rewriting, and the rewriting control unit determines whether to continue the rewriting based on a remaining capacity of the battery retrieved and the power amount required for the rewriting.

19 Claims, 12 Drawing Sheets

(51) Int. Cl.
*B60W 50/14* (2020.01)
*G06F 8/65* (2018.01)

(56) References Cited

U.S. PATENT DOCUMENTS

| | | | |
|---|---|---|---|
| 2020/0133812 A1* | 4/2020 | Ogawa | G06F 8/65 |
| 2020/0272451 A1 | 8/2020 | Inoue | |
| 2021/0157573 A1* | 5/2021 | Abe | G06F 8/654 |
| 2021/0165649 A1* | 6/2021 | Harata | G06F 8/654 |
| 2021/0191661 A1 | 6/2021 | Harata | |

* cited by examiner

| ID | REQUIRED POWER AMOUNT |
|---|---|
| P1_1 | ΔA1 |
| P1_2 | ΔA2 |
| ⋮ | ⋮ |

FIG.3

| VID | ID | CONSUMPTION POWER AMOUNT | TEMPERATURE |
|---|---|---|---|
| V001 | P1_1 | ΔA1_1 | T1 |
| V002 | P1_1 | ΔA1_2 | T2 |
| ⋮ | ⋮ | ⋮ | ⋮ |

FIG.9

| ID | REQUIRED POWER AMOUNT |
|---|---|
| P1_1 | $\Delta A1'(T)$ |
| P1_2 | $\Delta A2'(T)$ |
| ⋮ | ⋮ |

FIG.11

PROGRAM UPDATE CONTROL APPARATUS, PROGRAM UPDATE CONTROL METHOD, AND COMPUTER-READABLE STORAGE MEDIUM

The contents of the following Japanese patent application(s) are incorporated herein by reference:
NO. 2021-046133 filed on Mar. 19, 2021.

BACKGROUND

1. Technical Field

The present invention relates to a program update control apparatus, a program update control method, and a computer-readable storage medium.

2. Related Art

An ECU for which an application program can be rewritten is disclosed in Patent Document 1, as an ECU for a vehicle.
Patent Document 1: Japanese Patent Application Publication No. 2020-27666

BRIEF DESCRIPTION OF THE DRAWINGS

FIG. 3 illustrates an example of a data structure of required power amount information managed by an external apparatus 70.

FIG. 9 illustrates an example of a data structure of actual consumed power amount information managed by the external apparatus 70.

FIG. 11 illustrates the required power amount generated by the external apparatus 70.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
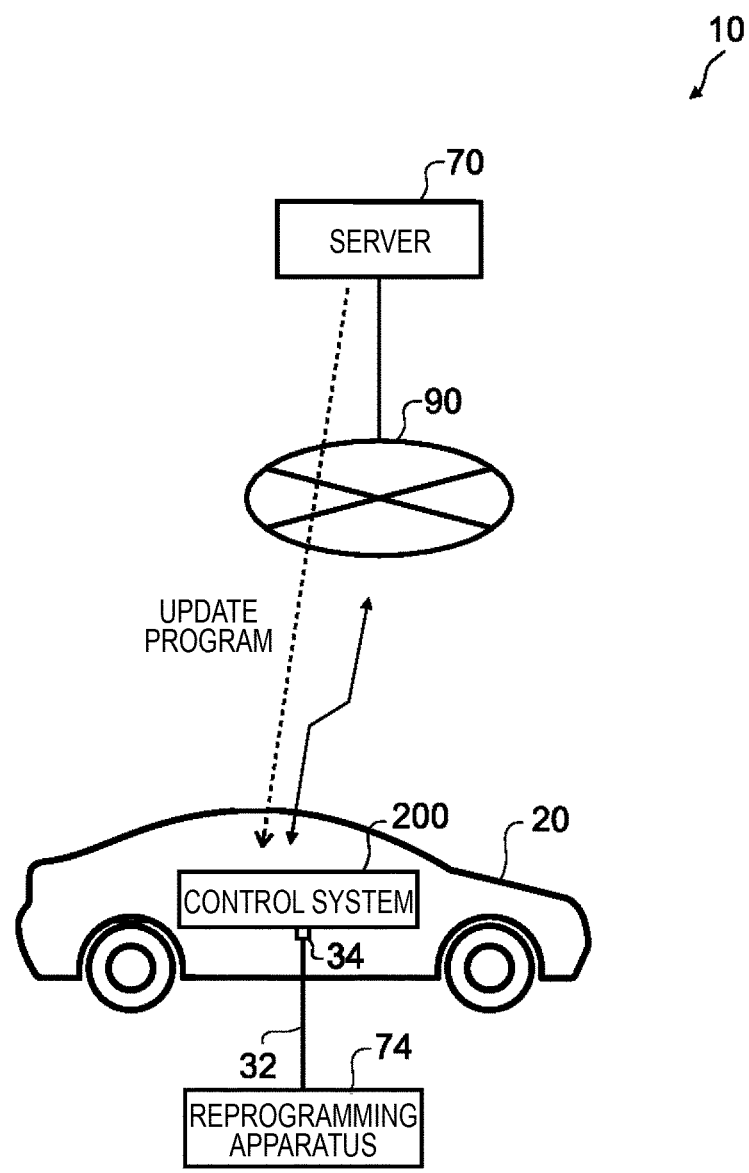
FIG. 1 schematically illustrates an updating system 10 according to one embodiment.

FIG. 1 schematically illustrates an updating system 10 according to one embodiment. The updating system 10 includes a vehicle 20, a reprogramming apparatus 74, and an external apparatus 70. The vehicle 20 includes a control system 200. The control system 200 performs control of the vehicle 20 and communication with the external apparatus 70 through a communication network 90. The communication network 90 includes an IP network such as the Internet, a P2P network, a dedicated line including VPN, a virtual network, a mobile communication network, or the like.

In the vehicle 20, the control system 200 includes a plurality of ECUs (Electronic Control Units) that perform control of the vehicle 20. The control system 200 retrieves, from an outside, a update program for the ECU of the control system 200. For example, the control system 200 receives, through the communication network 90, an update program transmitted from the external apparatus 70 via wireless communication. The control system 200 reprograms the ECU of the control system 200 by rewriting the program executed by the ECU of the control system 200 with the update program. Such a reprogramming is performed for the purpose of upgrading the function of the ECU of the control system 200, or the like. In this manner, the control system 200 updates the ECU by reprogramming the ECU over the air (OTA). In the present embodiment, rewriting a program executed by a device such as the ECU by an update program is referred to as a "program update".

When transmitting the update program of the control system 200, the external apparatus 70 transmits, to the control system 200, the update program along with information indicating the power amount required for performing the program update with the update program. In a case where rewriting of a program for a specific ECU needs to be performed sequentially by two update programs, the external apparatus 70 transmits, to the control system 200, information indicating the power amount require for the program update by each of the two update programs. Before starting the program update, the control system 200 retrieves the remaining capacity of a battery of the vehicle 20, and starts the program update upon checking that the predicted remaining capacity of the battery after the program update by the second update program is complete exceeds the power amount required to start the vehicle 20.

When the seat heater, the light, or the like of the vehicle 20 is operated while the program update is performed, the electrical power consumption is increased. Therefore, even when it is determined that the remaining capacity of the battery at the start of the program update is enough, there is a possibility that the actual remaining capacity at the time of completion of the program update falls below the power amount required to start the vehicle 20.

Therefore, the control system 200 sequentially retrieves the remaining capacity of the battery during the program update of the ECU by the first update program. The control system 200 determines whether the predicted remaining capacity of the battery at the time of completion of the program update by the second update program falls below the power amount require to start the vehicle 20, based on the remaining capacity of the battery retrieved during the program update of the ECU, and the power amount required for the program update of the ECU by the second update program. In a case where it is determined that the remaining capacity of the battery predicted at the time of completion of the program update by the second update program will be equal to or lower than a predetermined value, the program update by at least the second update program is not executed. In this manner, even in a case where the power consumption is increased due to the usage environment or the like of the vehicle 20 at the time of program update, the power amount required to start the vehicle 20 can be secured.

It should be noted that, the program update of the ECU of the control system 200 can be performed through a reprogramming apparatus 74, in addition to OTA. The reprogramming apparatus 74 is connected to a diagnosis port 34 through a diagnosis cable. The diagnosis port 34 is an OBD (On Board Diagnostics) connector, for example. The reprogramming apparatus 74 is connected to the diagnosis port 34 through a communication cable 32.

The reprogramming apparatus 74 transfers the update program received from the external apparatus 70 or the like to the control system 200, and causes the ECU of the control system 200 to execute a program update. In a case where a program update is performed by using the reprogramming apparatus 74, the power consumption during the program update may change also due to the model or the like of the reprogramming apparatus 74. Therefore, similarly to the case where a plurality of program updates are performed in an OTA manner as described above, in a case where the program update is performed by using the reprogramming apparatus 74, the reprogramming apparatus 74 sequentially retrieves the battery remaining capacity during the rewriting by the first update program. Then, based on the remaining capacity of the battery retrieved during execution of the rewriting of the ECU and the power amount required for the rewriting of the ECU by the second update program, in a case where it is determined that the predicted remaining capacity of the battery when the rewriting by the second update program is completed will be equal to or lower than a predetermined value, the reprogramming apparatus 74 does not cause the program update by at least the second update program to be executed. In this way, even in a case where the power consumption increases due to the use of the reprogramming apparatus 74, the power amount require to start the vehicle 20 can be secured.

Figure 2:
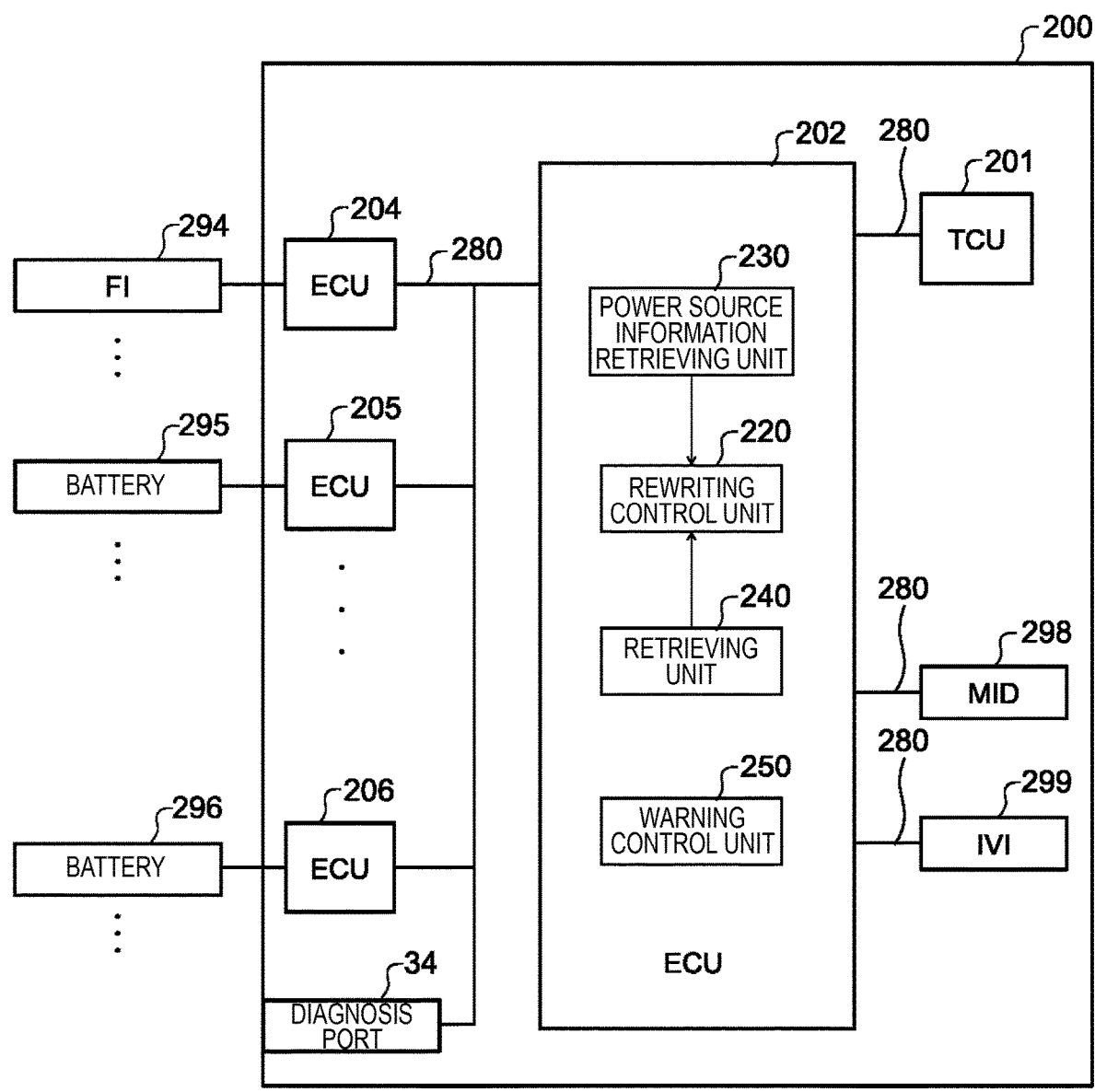
FIG. 2 schematically illustrates a system configuration of the control system 200 along with a device to be controlled.

FIG. 2 schematically illustrates the system configuration of the control system 200 along with a device to be controlled. The control system 200 includes a TCU 201, an ECU 202, an ECU 204, an ECU 205, an ECU 206, an MID 298, an IVI 299, and a diagnosis port 34.

The ECU 202 Is connected to the TCU 201, the ECU 204, the ECU 205 and the ECU 206 through an in-vehicle communication line 280. The ECU 202 mutually communicates with the TCU 201, the ECU 204, the ECU 205, the ECU 206, the MID 298 and the IVI 299 through the in-vehicle communication line 280. The ECU 202 integrally controls the TCU 201, the ECU 204, the ECU 205, the ECU 206, the MID 298 and the IVI 299. The in-vehicle communication line 280 may be configured to include a CAN (Controller Area Network), the Ethernet (registered trademark), or the like, for example.

The TCU 201 is a Telematics Control Unit. The TCU 201 mainly performs mobile communication. The TCU 201 transmits and receives data with the external apparatus 70 based on control by the ECU 202. The TCU 201 receives the update program transmitted from the external apparatus 70 through mobile communication based on control by the ECU 202. The TCU 201 may function as a wireless communication unit.

The diagnosis port 34 is a port on which a diagnosis apparatus for performing diagnosis of the ECU 202, the ECU 204, the ECU 205, the ECU 206, the MID 298 and the IVI 299, and a communication cable to be connected to the reprogramming apparatus 74 are mounted. The diagnosis port 34 is connected to the in-vehicle communication line 280. An apparatus connected to the diagnosis port can communicate with the ECU 202, the ECU 204, the ECU 205, the ECU 206, the MID 298 and the IVI 299 through the in-vehicle communication line 280 and the communication cable.

The MID 298 is a multi-information display. The IVI 299 is an in-vehicle infotainment information device (IVI), for example. The MID 298 and the IVI 299 may each function as a display control unit. The IVI 299 includes a wireless LAN communication function. The IVI 299 receives the update program transmitted from the external apparatus 70 through the wireless LAN communication, based on control by the ECU 202.

Each of the ECU 204, the ECU 205, and the ECU 206 is an ECU serving as a vehicle control unit for controlling at least part of the vehicle 20. Each of the ECU 204, the ECU 205, and the ECU 206 is an example of the "mobile object control unit". The ECU 204, the ECU 205, and the ECU 206 each control various devices of the vehicle 20. For example, the ECU 204 controls the FI 294 or the like that is a fuel injection apparatus.

The ECU 205 controls the battery 295 or the like. The battery 295 is, for example, a low voltage battery that functions as a 12V power source for the vehicle. The battery 295 is, for example, a lead storage battery or the like. To the contrary, the battery 296 is a high voltage battery that accumulates electric energy supplied to a prime mover such as the motor that generates power for running the vehicle 20. It should be noted that, in FIG. 2, the FI 294, the battery 295, and the battery 296 are each an example of a device to be controlled included in the vehicle 20, and the vehicle 20 may include a device to be controlled other than the device shown in FIG. 2.

In the present embodiment, a system configuration in which the control system 200 includes the TCU 201, the ECU 202, the ECU 204, the ECU 205, the ECU 206, the MID 298, and the IVI 299 is illustrated, but the system configuration of the control system 200 is not limited to the example of the present embodiment. In addition, in the present embodiment, as an illustration, a case where the mobile object control units that may become the target for the program update are the ECU 204 and the ECU 205, and the ECU 202 functions as the "program update control apparatus" for controlling the program update is described. It should be noted that, the mobile object control unit that may become the target for the program update is not limited to these ECUs. The mobile object control unit that may become the target for the program update may be any of the TCU 201, the ECU 202, the ECU 204, the ECU 205, the ECU 206, the MID 298, and the IVI 299.

The ECU 202 functions as the program update control apparatus for controlling the program update for the ECU. The ECU 202 includes a rewriting control unit 220, a retrieving unit 240, a power source information retrieving unit 230, and a warning control unit 250.

The rewriting control unit 220 performs control over rewriting of the program executed by the ECU for controlling at least a part of the vehicle 20 with a new program. In the description of the present embodiment, the new program may be referred to as an "update program". The retrieving unit 240 retrieves, from an external apparatus, information related to the power amount required for the new program and the rewriting. The power source information retrieving unit 230 retrieves the remaining capacity of the battery 295 of the vehicle 20 to be used for the rewriting. The rewriting control unit 220 starts the rewriting based on the information related to the power amount required for the rewriting. The power source information retrieving unit 230 retrieves the remaining capacity of the battery 295 during the rewriting. The rewriting control unit 220 determines whether to continue the rewriting based on the remaining capacity of the battery 295 retrieved during execution of the rewriting by the power source information retrieving unit 230 and the power amount required for the rewriting.

The program update for a ECU having a plurality of storage areas as a storage area for the program will be described. Here, it is assumed that the ECU 205 has a plurality of storage areas. The ECU 205 includes a storage unit having a first storage area and a second storage area as the storage area for the program. The ECU 205 reads either one of the program stored in the first storage area and the program stored in the second storage area at the time of activation. The rewriting control unit 220 may start the writing of the new program to the second storage area in a case where the program executed by the ECU is stored in the first storage area. The power source information retrieving unit 230 may notify the rewriting control unit 220 of the remaining capacity retrieved by the program stored in the first storage area during execution of the rewriting.

In addition, the retrieving unit 240 retrieves, from the external apparatus, the first program and the second program as the new program, as well as retrieves information indicating the power amount require for the writing of the first program and the power amount required for the writing of the second program. The rewriting control unit 220 starts the writing of the first program to the second storage area in a case where the program executed by the ECU 205 is stored in the first storage area. The power source information retrieving unit 230 retrieve the remaining capacity of the battery 295 during the writing of the first program to the second storage area and before the writing of the second program to the second storage area is started. The rewriting control unit 220 determines whether to continue the rewriting based on the remaining capacity retrieved by the power source information retrieving unit 230 during the writing of the first program to the second storage area and the power amount require for the writing of the second program.

When a difference between the remaining capacity retrieved by the power source information retrieving unit 230 during the writing of the first program to the second storage area and electrical power required for the writing of the second program is below a predetermined value, the rewriting control unit 220 may stop the writing of the first program and configured not to start the writing of the second program. When the difference between the remaining capacity retrieved by the power source information retrieving unit 230 during the writing of the first program to the second storage area and the electrical power required for the writing of the second program falls below a predetermined value, the warning control unit 250 may cause a warning to be output.

The program update for an ECU having a single storage area as the storage area for the program will be described. In the present embodiment, it is assumed that the ECU 204 has a single storage area. The ECU 204 includes a storage unit having a single storage area for storing the program executed by the ECU 204. The retrieving unit 240 retrieves, from the external apparatus 70, the first program and the second program as the new program for the ECU 204, as well as retrieves the power amount require for the writing of the first program and the power amount required for the writing of the second program. The rewriting control unit 220 starts the writing of the first program to the storage area in which the program executed by the ECU is written. When the writing of the first program to the storage area is complete, power source information retrieving unit 230 retrieves the remaining capacity of the battery 295 before performing the writing of the second program to the single storage area. When the difference between the remaining capacity retrieved by the power source information retrieving unit 230 before the writing of the second program to the single storage area is performed and the power amount required for the writing of the second program is below a predetermined value, the rewriting control unit 220 determines not to start the writing of the second program.

The warning control unit 250 may case a warning to be output when the difference between the remaining capacity indicated by the information retrieved by the power source information retrieving unit 230 and the power amount required for the rewriting retrieved by the retrieving unit 240 is below the predetermined value. The rewriting control unit 220 may start the rewriting of the new program when a charger is connected to the battery 295 after the warning has been output.

After the retrieving unit 240 has retrieved, from the external apparatus 70, information related to the new program and a power amount required for the rewriting, when an ignition power source of the vehicle 20 is turned off, the rewriting control unit 220 may start the rewriting based on information related to the power amount required for the rewriting, and the power source information retrieving unit 230 may retrieve the remaining capacity of the battery 295 during execution of the rewriting, and the rewriting control unit 220 may determine whether to continue the rewriting based on the power amount required for the rewriting and the remaining capacity.

Here, the program update will be described. Program update processing will be described in the case where a device to be targeted for the program update is the ECU and a memory in the ECU for storing firmware is a single bank memory (so-called one-sided ROM). In this case, since there is only one program storage area in the ECU for storing the firmware, the update program cannot be written in the program storage area when the ECU is operating in accordance with the program stored in the program storage area. When performing the program update of the ECU, the rewriting control unit 220 instructs the ECU to perform the program update after transferring, to the ECU, the update program to be stored in a predetermined data storage area in the ECU. The ECU, when the program update is instructed, executes a control code for performing the program update to write the update program transferred to the data storage area in the program storage area and activate the update program. Activation of the update program includes processing of setting a activation parameter of the ECU so as to load the update program at the time of activation of the ECU, for example, to start controlling based on the update program.

Next, program update processing will be described in the case where an internal memory in the ECU is a double bank memory (so-called two-sided ROM). In this case, since there are two program storage areas in the ECU for storing the firmware, the update program can be written in a second program storage area when the ECU is operating in accordance with the program stored in a first program storage area. That is, so-called back face writing enables the update program to be written in the second program storage area, or back face, program storage area. Accordingly, even while the vehicle 20 is running, for example, the update program can be written in the second program storage area. Therefore, upon transferring of the update program to the ECU, the rewriting control unit 220 instructs the ECU to write the update program to the second program storage area. Upon completion of writing of the update program in the second program storage area in the ECU, the program update of the ECU is enabled. In a case where the rewriting control unit 220 performs the program update of the ECU, the rewriting control unit 220 instructs the ECU to activate the update program written to the second program storage area. Activation of the update program includes processing of setting a activation parameter of the ECU so as to load the update program stored in the second program storage area at the time of activation of the ECU, for example, to start controlling based on the update program. For example, activation of the update program includes processing of validating the second program storage area as a read area of the program while invalidating the first program storage area as the read area of the program. In this manner, the "program update" is a concept that includes instructing to write the update program in the program storage area in the ECU. In addition, the "program update" is a concept that includes instructing activation of the update program written in the program storage area. By completing the activation, the existing program is rewritten with the new update program.

In a program update of an ECU having an internal memory of a single bank memory, there is a possibility that the ECU cannot control the vehicle during a period in which the update program is being written to the program storage area and a period in which activation of the update program is being performed. On the other hand, in a program update for an ECU having an internal memory of a double bank memory, during a period in which the update program is being written to the program storage area on the back face (inactive side), the ECU can perform control over the vehicle with a program stored on the other front face (active side). In the present embodiment, there may be cases where the ECU 204 is described as including a single bank memory and the ECU 205 is described as including a double bank memory.

Figure 3:
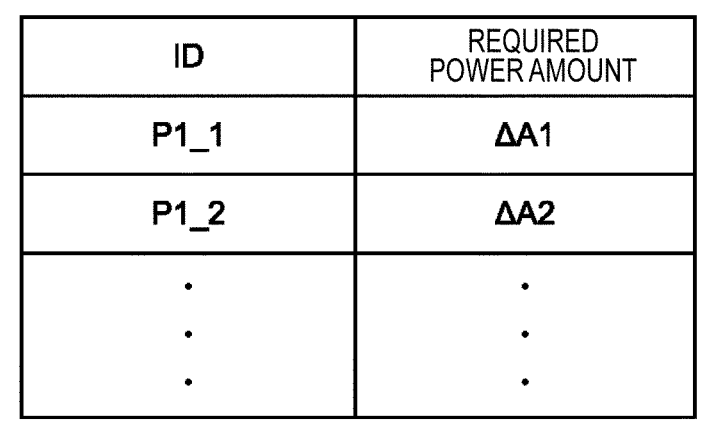

FIG. 3 illustrates an example of a data structure of required power amount information managed by the external apparatus 70. The required power amount information is information that associates an "ID" and a "required power amount" with each other. The "ID" is identification information of the update program. The "required power amount" is the power amount required when performing program update by the update program. The required power amount is a designed value that is set for each update program.

The rewriting control unit 220 causes configuration information including version information of the program for each ECU to be transmitted to the external apparatus 70 through the TCU 201 when the IG power source is turned on. The external apparatus 70 selects a update program for rewriting the program of the ECU included in the vehicle 20 based on the configuration information transmitted from the vehicle 20. The external apparatus 70 refers to the required power amount information to identify the information indicating the required power amount of the selected update program. The external apparatus 70 transmits, to the vehicle 20, information indicating the identified required power amount along with the selected update program.

It should be noted that, in the present embodiment, the first program identified by "P1_1" is a version 1.1 program for a specific ECU, and the second program identified by "P1_2" is a version 1.2 program for the same ECU. In a case where the version of the program for the ECU included in the control system 200 is 1.0, and where the version of the current latest program is 1.2, the external apparatus 70 transmits, to the control system 200, a first program which is of version 1.1 and a second program which is of version 1.2, and a program package including the required power amount $\Delta A1$ and $\Delta A2$. Upon reception of the program package from the external apparatus 70, after rewriting the program for the ECU by the first program of version 1.1, the rewriting control unit 220 performs the rewriting of program of the same ECU by the second program of version 1.2, thereby performing the program update.

Figure 4:
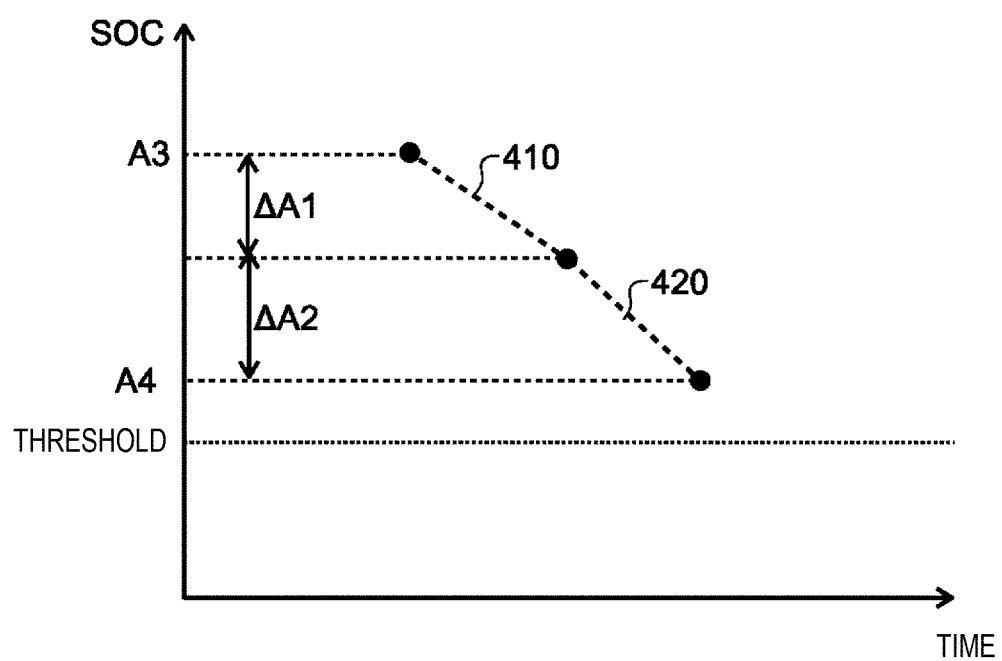
FIG. 4 illustrates an example of a temporal change in the remaining capacity of a battery 295 that is predicted in a case where program updates by a first program and a second program are sequentially performed.

FIG. 4 illustrates an example of a temporal change in the remaining capacity of a battery 295 that is predicted in a case where program updates by a first program and a second program are sequentially performed. The line indicated by the reference numeral 410 in FIG. 4 indicates the change in the battery remaining capacity in a case where the program update by the first program has been performed. In addition, the line indicated by the reference numeral 420 indicates the change in the battery remaining capacity in a case where the program update by the second program has been performed.

As shown in FIG. 4, in a case where the remaining capacity before starting the program update is A3, the remaining capacity is predicted to decrease as low as A4 by performing the program update by the first program and the second program. As an example, $A4=A3-(\Delta A1+\Delta A2)$. The rewriting control unit 220 determines to start the program update by the first program and the second program in a case where A4 exceeds the threshold. It should be noted that, the threshold may be set to be a value that is higher than the power amount required at the time of starting the vehicle 20, for example.

Figure 5:
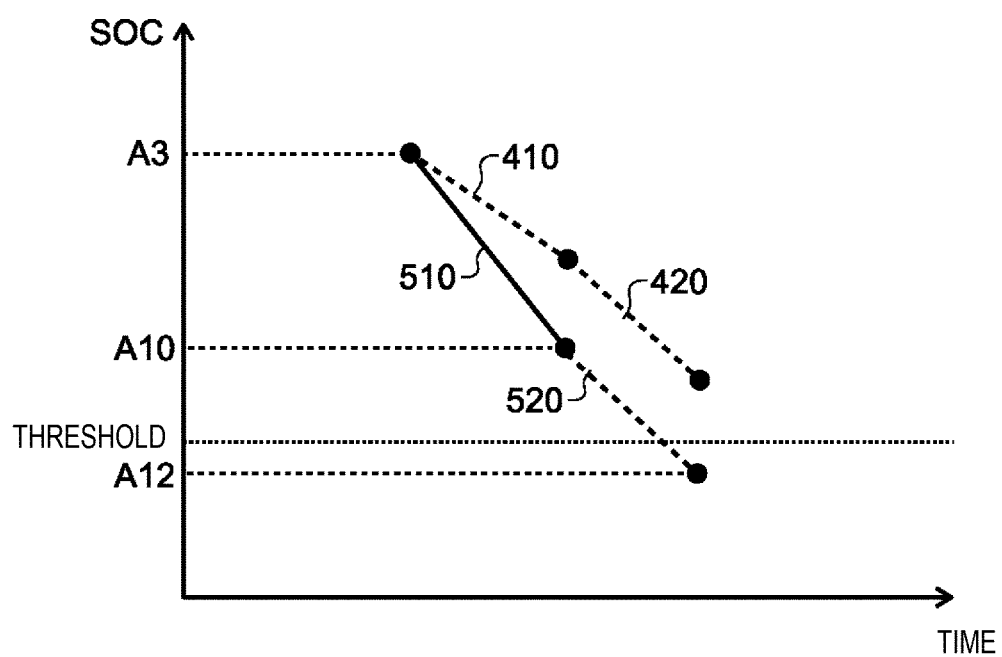
FIG. 5 illustrates an example of a temporal change in the remaining capacity of the battery 295 in a case where a program update for a single bank memory ECU is performed.

FIG. 5 illustrates an example of a temporal change in the remaining capacity of the battery 295 in a case where a program update for a single bank memory ECU is performed.

In a case where the remaining capacity before the program update is A3, the power source information retrieving unit 230 retrieves the remaining capacity A10 of the battery 295 when the program update with the first program is completed by the control of the rewriting control unit 220. It should be noted that, the line indicated by the reference numeral 510 in FIG. 5 shows the change in the actual remaining capacity of the battery 295 when the program update by the first program has been performed. As shown in FIG. 5, the consumption power amount during a period in which the program update by the first program is being performed is higher compared to the designed value represented by the reference numeral 410.

The line indicated by the reference numeral 520 shows a prediction of the change in the battery remaining capacity when it is assumed that the program update by the second program is performed following the program update by the first program. The slope and the length of the line indicated by the reference numeral 520 is equal to the slope and the length of the line indicated by the reference numeral 420, respectively. The rewriting control unit 220 predicts the remaining capacity A12 at the time of completion of the program update by the second program, based on A10 and $\Delta A2$. For example, the rewriting control unit 220 predicts the remaining capacity A12 at the time of completion of the program update by the second program from $A12=A10-$ ΔA2. Then, the rewriting control unit 220 determines not to perform the program update by the second program when A12 is equal to or lower than the threshold. In this way, by not performing the program update by the second program, it is ensured that problems do not occur when starting the vehicle 20.

It should be noted that, the rewriting control unit 220 may predict the remaining capacity at the time of completion of the program update by the second program based on the difference between A3 and A10, ΔA1, and ΔA2. For example, the power amount require during the period in which the program update by the second program is performed may be modified such as ΔA2+(A3−A10−ΔA1), the remaining capacity at the time of completion of the program update by the second program may be predicted based on the modified power amount and the current remaining capacity A10.

Figure 6:
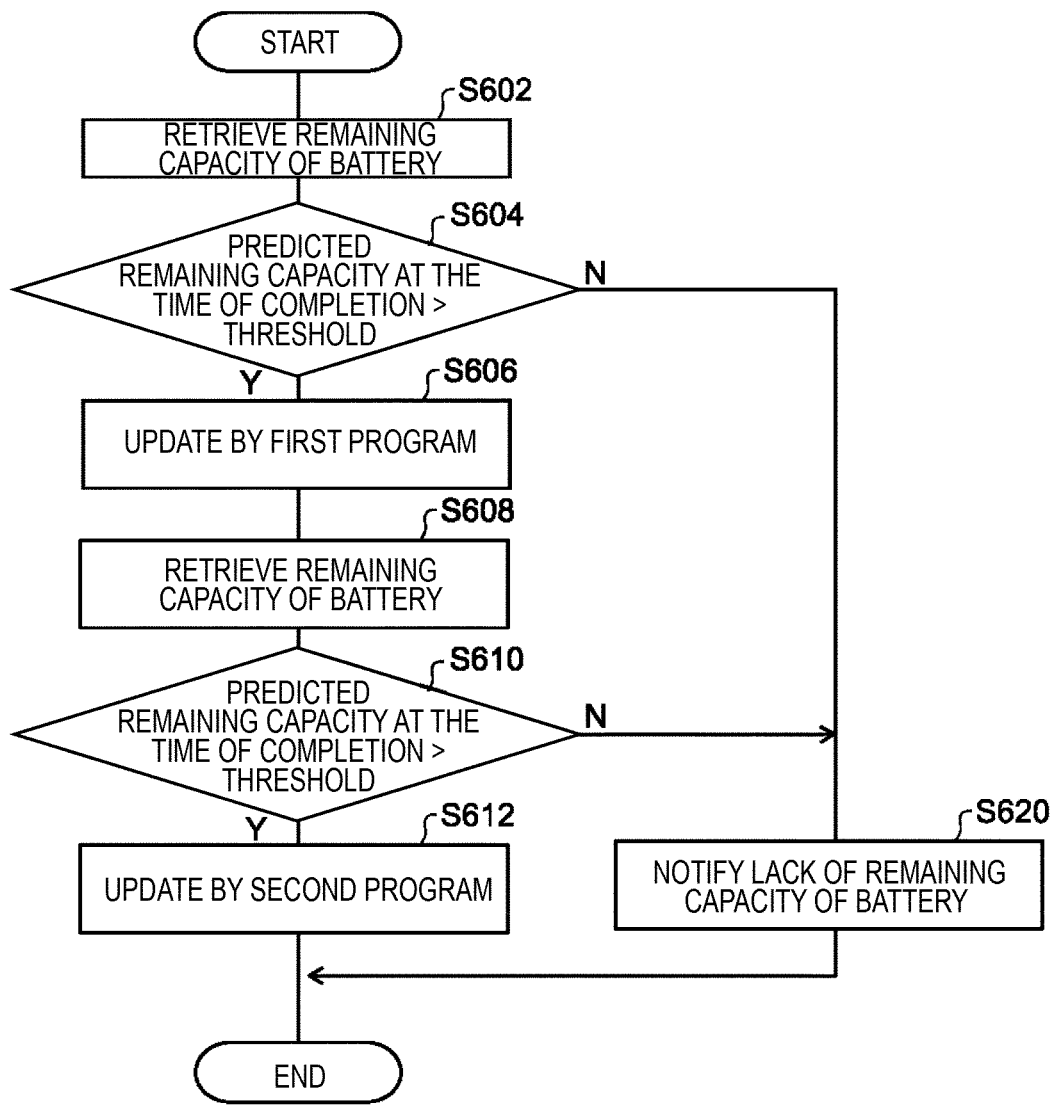
FIG. 6 is a flow chart illustrating the execution procedure of a processing in a case where the program update for a single bank memory ECU is performed.

FIG. 6 is a flow chart illustrating the execution procedure of a processing in a case where the program update for a single bank memory ECU is performed. The processing of the flow chart in FIG. 6 starts when the IG power source is turned off.

At S602, the power source information retrieving unit 230 retrieves the remaining capacity of the battery 295. At S604, the rewriting control unit 220 determines whether the remaining capacity of the battery 295 predicted at the time of completion of the program update by the first program and the second program exceeds the threshold.

In a case where it is determined that the remaining capacity of the battery 295 predicted at the time of completion of the program update exceeds the threshold, the rewriting control unit 220 determines to start the program update, and at S606, causes the program update by the first program to be executed. Upon completion of the program update by the first program, at S608, the power source information retrieving unit 230 retrieves the remaining capacity of the battery 295. At S610, the rewriting control unit 220 predicts the remaining capacity of the battery 295 at the time of completion of the program update by the second program to the ECU, and determines whether the predicted remaining capacity exceeds the threshold. In a case where the predicted remaining capacity exceeds the threshold, at S612, the program update by the second program is started, and the processing of this flowchart is ended upon completion of the program update.

At S604, in a case where it is determined that the remaining capacity of the battery 295 predicted at the time of completion of the program update is equal to or lower than the threshold, at S620, the warning control unit 250 notifies that the program update has not been performed due to lack of the remaining capacity of the battery. For example, the warning control unit 250 may notify the user through the IVI 299. In addition, in a case where it is determined at S610 that the remaining capacity of the battery 295 predicted at the time of completion of the program update is equal to or lower than the threshold, the processing also proceeds to S620, to notify that the program update has not been performed due to the lack of remaining capacity of the battery. It should be noted that, after notifying at S620, in a case where the power source information retrieving unit 230 senses that a battery charger has been connected to the battery 295, the program update by the second program may start.

Figure 7:
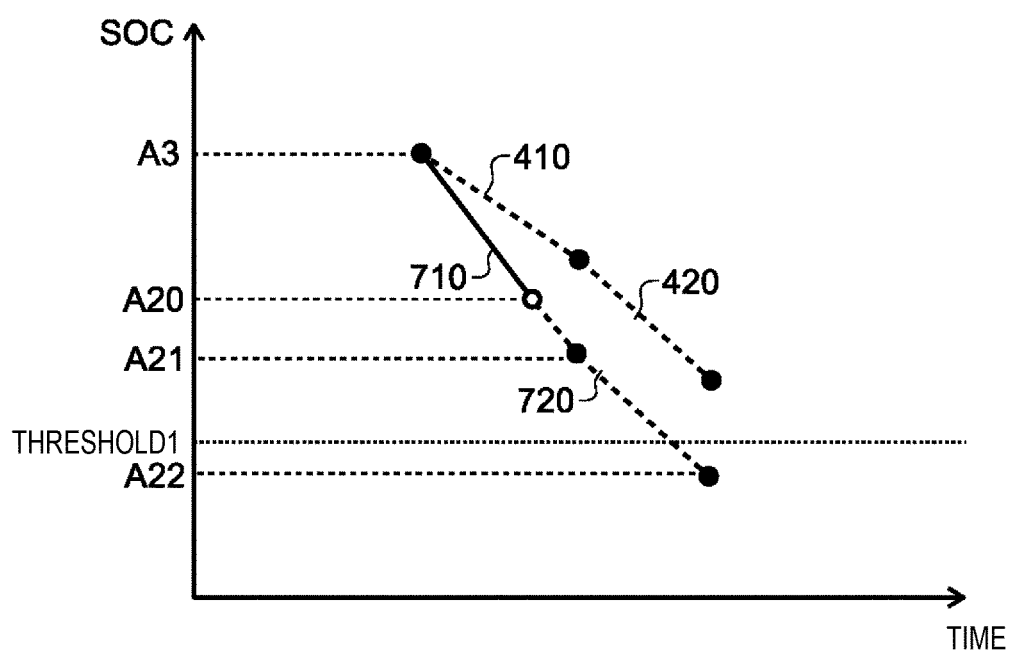
FIG. 7 illustrates an example of a temporal change in the remaining capacity of the battery 295 in a case where the program update for a double bank memory ECU is performed.

FIG. 7 illustrates an example of a temporal change in the remaining capacity of the battery 295 in a case where the program update for a double bank memory ECU is performed. Similarly to FIG. 5, the remaining capacity of the battery 295 at the start of the program update is defined as A3. The power source information retrieving unit 230 retrieves the remaining capacity A20 of the battery 295 during execution of the program update for the ECU by the first program. It should be noted that, the solid line indicated by the reference numeral 710 in FIG. 7 indicates the change in the actual remaining capacity of the battery 295 when the program update by the first program is being performed. As shown in FIG. 7, the consumption power amount during execution of the program update by the first program is higher compared to the designed value represented by the reference numeral 410.

During execution of the program update by the first program, the rewriting control unit 220 determines whether the remaining capacity at the time of completion of the program update by the second program becomes equal to or lower than the threshold, and when the remaining capacity at the time of completion of the program update by the second program is equal to or lower than the threshold, determines to stop the program update by the first program. As an example, the rewriting control unit 220 determines whether the difference between the remaining capacity of the battery 295 during the program update by the first program and ΔA2 is equal to or lower than the threshold, and when it is determined that the difference between the remaining capacity of the battery 295 during the program update and ΔA2 is equal to or lower than the threshold, determines to stop the program update by the first program. As another example, the rewriting control unit 220 predicts the remaining capacity A 21 at the time of completion of the program update by the first program. For example, the rewriting control unit 220 predicts, during the writing of the first program to the ECU, the remaining capacity A21 at the time of completion of the program update by the first program, based on the current remaining capacity A20, the data size after completion of writing of the first program, and the data size of the entire first program. Then, the rewriting control unit 220 predicts the remaining capacity A22 at the time of completion of the program update by the second program from A22=A21−ΔA2. That is, in this example, as shown by the line indicated by the reference numeral 720, the change in the battery remaining capacity is predicted for a case where it is assumed that the program update by the second program is performed following the program update by the first program. It should be noted that, the slope and the length of the line indicated by the reference numeral 720 is equal to the slope and the length of the line indicated by the reference numeral 420, respectively. Upon determining that the predicted remaining capacity A22 will be equal to or lower than the threshold, the rewriting control unit 220 determines not to perform the program update by the second program and determines to stop the program update by the first program.

Even while the writing of the first program to the program storage area in one of the double bank memory is being performed, the ECU including a double bank memory is capable of operating based on an active second program that is stored in the program storage area in the other memory. The ECU including the double bank memory is capable of operating even when the writing of the first program is stopped in the middle. Therefore, when performing program update of the ECU including a double bank memory, the remaining capacity of the battery 295 during the program update by the first program can be regularly retrieved, and when it is determined that the remaining capacity at the time of completion of the program update by the second program will fall below the threshold, the program update can be stopped before the program update by the first program is completed. In this way, it can be determined earlier to stop the program update before the program update by the first program is completed.

It should be noted that, the rewriting control unit 220 may predict the remaining capacity at the time of completion of the program update by the second program based on the difference between A3 and A21, ΔA1, and ΔA2. For example, the power amount require during the period in which the program update by the second program is performed may be modified such as ΔA2+(A3−A21−ΔA1), the remaining capacity at the time of completion of the program update by the second program may be predicted based on the modified power amount and the remaining capacity A21.

Figure 8:
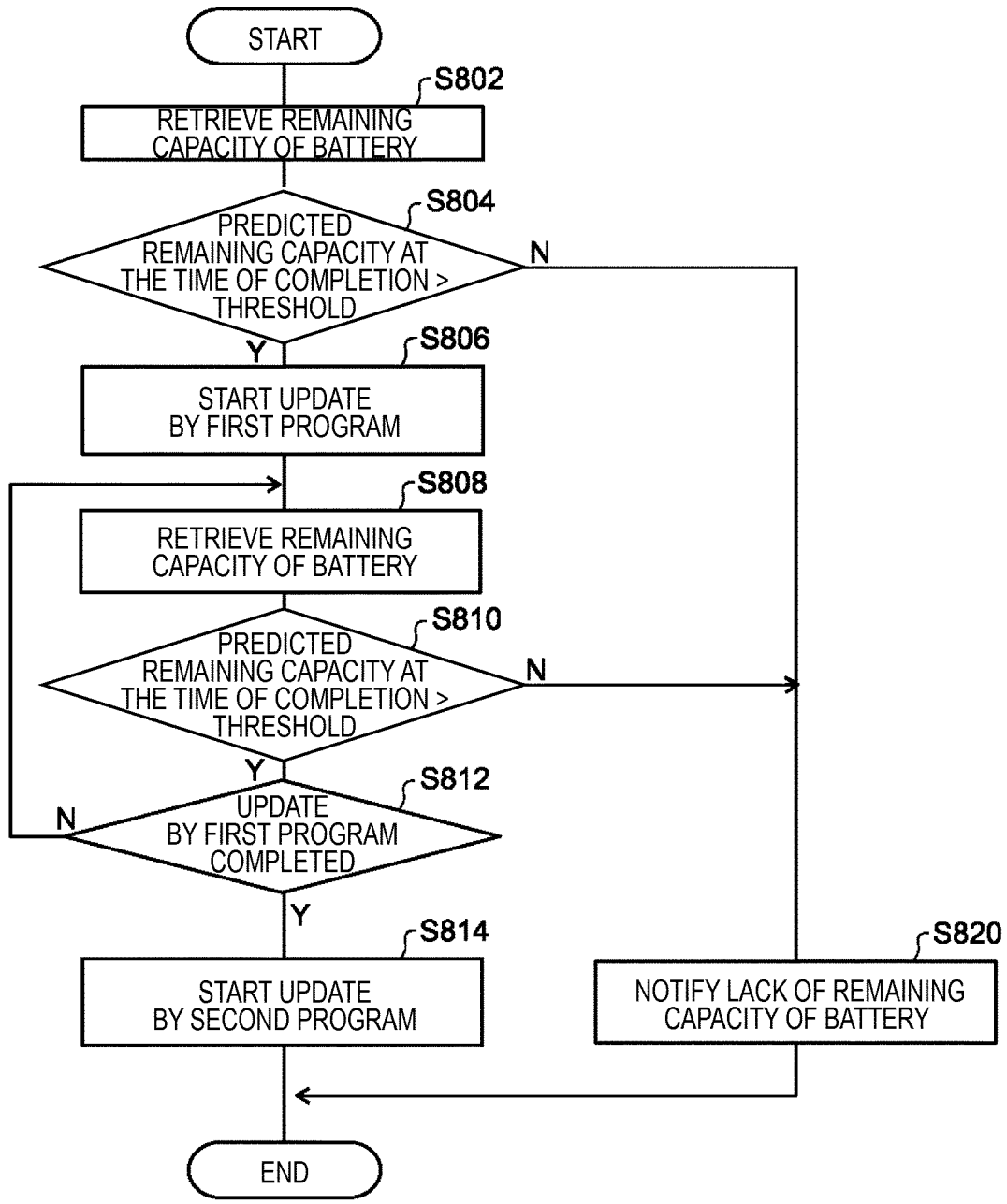
FIG. 8 is a flow chart illustrating an execution procedure of a processing in a case where the program update for a double bank memory ECU is performed.

FIG. 8 is a flow chart illustrating an execution procedure of a processing in a case where the program update for a double bank memory ECU is performed. The processing of the flow chart in FIG. 8 starts when the IG power source is turned off.

At S802, the power source information retrieving unit 230 retrieves the remaining capacity of the battery 295. At S804, the rewriting control unit 220 determines whether the remaining capacity of the battery 295 predicted at the time of completion of the program update by the first program and the second program exceeds the threshold.

In a case where it is determined that the remaining capacity of the battery 295 predicted at the time of completion of the program update exceeds the threshold, the rewriting control unit 220 determines to start the program update, and at S806, causes the program update by the first program to be started. At S808, the power source information retrieving unit 230 retrieves the remaining capacity of the battery 295. At S810, the rewriting control unit 220 determines whether the remaining capacity at the time of completion of the program update by the second program exceeds the threshold. In a case where the remaining capacity at the time of completion of the program update by the second program exceeds the threshold, at S812, it is determined whether the program update by the first program has been completed. In a case where the program update by the first program has not been completed, the processing proceeds to S808. In a case where the program update by the first program has been completed, at S814, the rewriting control unit 220 causes the program update by the second program to be executed, and ends the processing of this flowchart.

At S804, in a case where it is determined that the remaining capacity of the battery 295 predicted at the time of completion of the program update is equal to or lower than the threshold, at S820, the warning control unit 250 notifies that the program update has not been performed due to lack of the remaining capacity of the battery. For example, the warning control unit 250 may notify the user through the IVI 299. In addition, in a case where it is determined at S810 that the remaining capacity at the time of completion of the program update by the second program is equal to or lower than the threshold, the processing also proceeds to S820, to notify that the program update has not been performed due to the lack of remaining capacity of the battery. It should be noted that, after notifying at S820, in a case where the power source information retrieving unit 230 senses that a battery charger has been connected to the battery 295, the program update by the first program may be continued.

As described above, according to the control system 200, since it is determined whether to continue the program update by retrieving the remaining capacity of the battery 295 when the program update is completed, for example, or during execution of the program update, the occurrence of a so-called dead battery can be suppressed. In addition, even in a case where the power consumption is increased due to the usage environment or the like of the vehicle 20 at the time of program update, the power amount required to start the vehicle 20 can be secured. Further, even under circumstances where the remaining capacity does not change according to the design relative to the power consumption, such as when the battery 295 is deteriorated, or when the battery that is not a genuine product is used, the possibility of the occurrence of a dead battery can be reduced. Particularly, in a case where a plurality of program update is to be performed, since the period for which the program update is performed becomes longer, the error in the power amount that is actually consumed in relation to the required power amount becomes larger, and the possibility of the occurrence of a dead battery is increased. However, according to the control system 200, since it is determined whether to continue the program update by retrieving the remaining capacity of the battery 295 each time the respective program updates are completed, or during execution of the respective program updates, even in a case where a plurality of program updates are performed, the possibility of the occurrence of a dead battery can be reduced.

Figure 10:
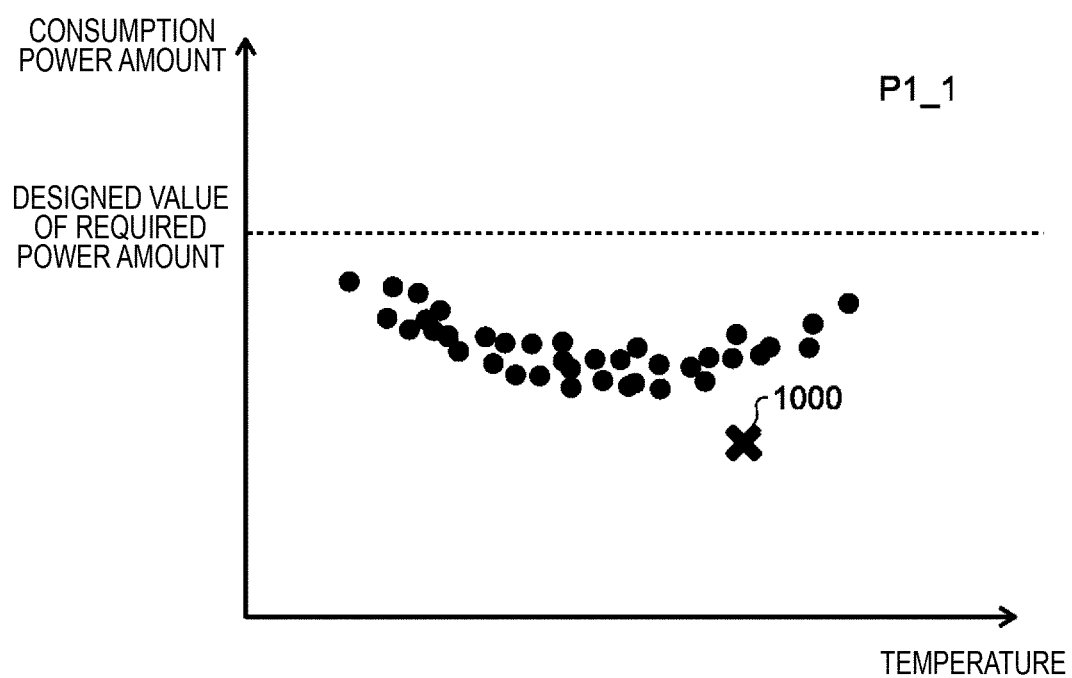
FIG. 10 schematically illustrates an example of temperature dependency of the consumption power amount at the time of program update for each of the vehicles, along with the designed value of the required power amount.

With reference to FIG. 9 to FIG. 11, a method for calculating, by the external apparatus 70, the required power amount to be stored in the required power amount information by using a measured value of the consumption power amount at the time of program update for each of the vehicles will be described.

The external apparatus 70 collects, from each of the vehicles, information indicating the power amount consumed when the program update was performed in each of the vehicles. FIG. 9 illustrates an example of a data structure of actual consumed power amount information managed by the external apparatus 70. The actual consumed power amount information associates "VID", "ID", "consumption power amount", and "temperature" with each other.

The "VID" is identification information of the vehicle. The "ID" is identification information of the update program. The "consumption power amount" is the power amount consumed when the program update by the update program was performed. The "temperature" is the temperature at the time when the program update was performed in each of the vehicles.

For example, in vehicle 20, the ECU 202 measures the discharge amount from the battery 295 during the program update by the update program is being performed, calculates the consumption power amount based on the measured discharge amount, and transmits, to the external apparatus 70, performance information including the calculated consumption power amount, the ID of the update program, the ID allocated to the vehicle 20, the location information of the vehicle 20 at the time the program update was performed, and information indicating the time at which the program update was performed. The external apparatus 70 retrieves the temperature at the time when the program update was performed in the vehicle 20, based on the location information of the vehicle 20 retrieved from the ECU 202, the information indicating the time at which the program update was performed, and the temperature information in each region in the past. The external apparatus 70 stores, as the actual consumed power amount information, the identified temperature, and the identification information of the vehicle, the ID of the update program and the consumption power amount included in the performance information collected from each of the vehicles in association with each other.

FIG. 10 schematically illustrates an example of temperature dependency of the consumption power amount at the time of program update for each of the vehicles, along with the designed value of the required power amount. For example, when the temperature is low, since the seat heater or the like may be operated by the user, the power consumption may increase. As shown in FIG. 10, the power consumption when a program update by the same update program of the same version is performed may be dependent on the temperature.

The external apparatus 70 generates the required power amount to be stored in the required power amount information shown in FIG. 3 by using the actual consumed power amount information. For example, the external apparatus 70 classifies the consumption power amount at the time of program update collected from each of the vehicles by temperature, and calculates the required electrical power to be stored in the required power amount information for each temperature. It should be noted that, as indicated by the reference numeral 1000 in FIG. 10, in a case where a consumption power amount having a large difference with the consumption power amount measured at other vehicles exists, the required power amount may be calculated excluding the data for that consumption power amount.

As shown in FIG. 10, in a case where the consumption power amount actually measured for each of the vehicles is lower than the designed value, the required power amount that is calculated may be come lower than the designed value. In a case where the required power amount that is calculated is lower than the designed value, more program update can be executed within the range of the remaining capacity of the battery. Therefore, since program updates of more ECUs is caused at once, the external apparatus 70 can select more update programs based on the required power amount and transmit the same to the vehicle 20.

FIG. 11 illustrates the required power amount generated by the external apparatus 70. The external apparatus 70 stores, as the required power amount described in relation to FIG. 3, the required power amount calculated based on the measured value. The required power amount calculated by the external apparatus 70 from the measured value is stored in the "required power amount". The required power amount is the power amount using the temperature T as a parameter. The required power amount may be represented with a function using the temperature T as a parameter. The required power amount may be discrete numeric value information corresponding to a plurality of temperatures T.

When transmitting the update program to the vehicle 20, the external apparatus 70 transmits a program package including the update program and the required power amount calculated from the measured value to the vehicle 20. At the vehicle 20, the rewriting control unit 220 identifies the required power amount corresponding to the current temperature based on the required power amount received from the external apparatus 70 and the current temperature. The rewriting control unit 220 determines whether to start the program update based on the identified required power amount. In addition, the rewriting control unit 220 determines whether to stop the program update at the time of completion of the program update by the first program or during execution of the program update by the first program, based on the identified required power amount.

It should be noted that, as indicated by the reference numeral 1000 in FIG. 10, in a case of a vehicle for which the measured consumption power amount is far from the consumption power amount measured for other vehicles, the designed value of the required power amount or the required power amount calculated from the measured value of other vehicles are not directly used, and the consumption power amount that was actually measured is classified for each vehicle, and the required power amount may be calculated for each vehicle.

In the above description, description has been made assuming that the ECU 202 integrally controls the program update that is mainly performed OTA. However, the control in a case where the control of the program update is performed by the reprogramming apparatus 74, a similar processing as that executed by the ECU 202 in a case where the program update is performed OTA may be applied. In this case, the reprogramming apparatus 74 may include a functional configuration corresponding to the rewriting control unit 220, the power source information retrieving unit 230, and the warning control unit 250.

The reprogramming apparatus 74 is connected to the in-vehicle communication line 280 with a communication cable 32, and controls the rewriting of the program through the communication cable 32 from the outside of the vehicle 20. It should be noted that, in an embodiment where control of the program update is performed by the reprogramming apparatus 74, when warning information that is output in such as case as where the program update is not started is output, the warning information may be displayed on a display screen of the reprogramming apparatus 74.

In a case where the program update is performed using the reprogramming apparatus, the power consumption at the time of program update may be different from that in the case where the program update is performed OTA. In addition, the power consumption at the time of program update may change by the model of the reprogramming apparatus used or by the individual reprogramming apparatus. Therefore, the external apparatus 70 may collect, form the reprogramming apparatus, the performance information indicating the consumption power amount in a case where control of the program update is performed using the reprogramming apparatus in each of the vehicles, and calculate the required power amount in a case where the reprogramming apparatus is used based on the collected performance information. At this time, the external apparatus 70 may classify the required power amount for each model of the reprogramming apparatus or for individual reprogramming apparatus, based on the consumption power amount included in the performance information, and calculate the required power amount for each model of the reprogramming apparatus or for the individual reprogramming apparatus.

The vehicle 20 is a vehicle as an example of transportation equipment. The vehicle may be an automobile such as an automobile equipped with an internal combustion engine, an electric vehicle, a fuel cell vehicle (FCV), or the like. The automobile includes a bus, a truck, a motorcycle, or the like. The vehicle may be a saddle riding type vehicle, or the like, or may be a bike. The transportation equipment includes, in addition to the vehicle, equipment such as an aircraft including an unmanned aerial vehicle, and a ship. The transportation equipment may be any equipment that transports people or goods.

The transportation equipment is an example of the mobile object. The mobile object is not limited to the transportation equipment, and may be any movable equipment.

Figure 12:
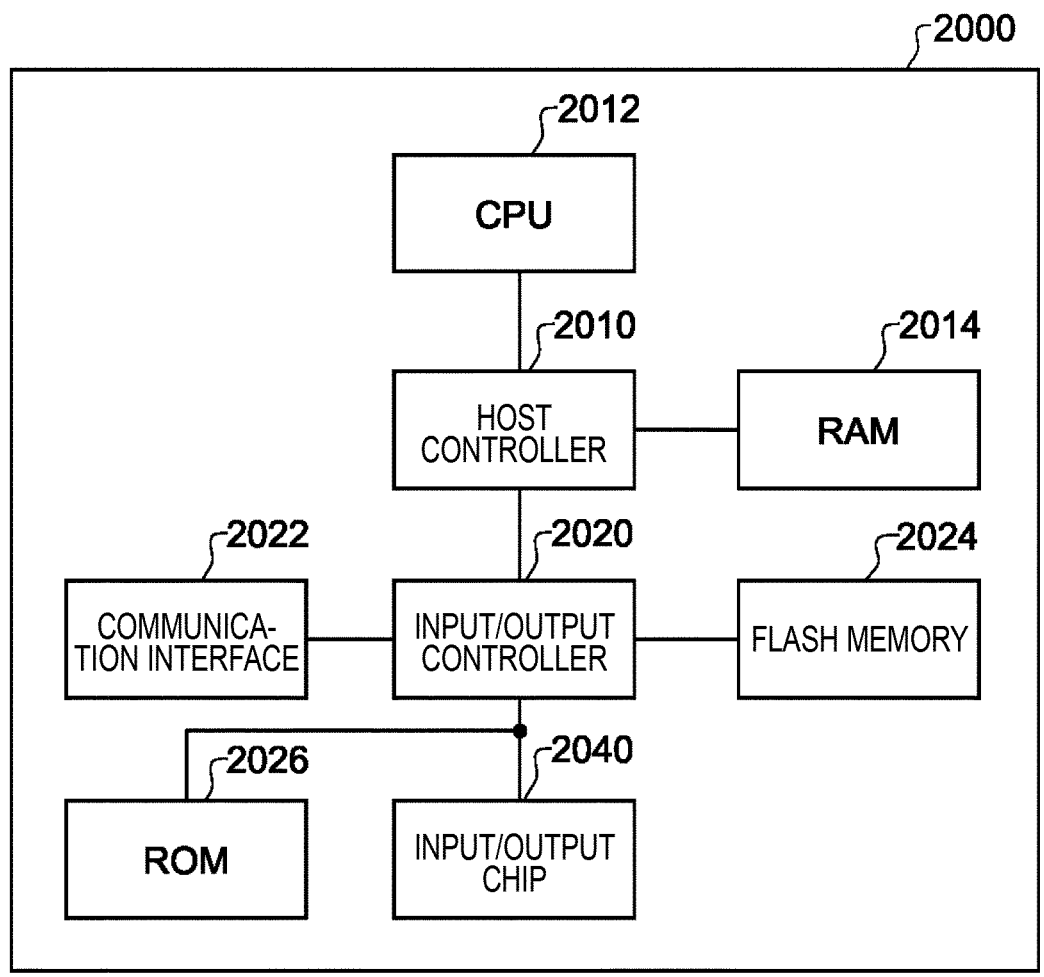
FIG. 12 illustrates an example of a computer 2000.

FIG. 12 shows an example of a computer 2000 in which a plurality of embodiments of the present invention may be entirely or partially embodied. A program installed in the computer 2000 can cause the computer 2000 to function as a system such as a control system or each part of the system or an apparatus such as an information processing apparatus or each part the apparatus according to the embodiments, perform operations associated with the system or each part of the system or the apparatus or each part of the apparatus, and/or perform a process or steps of the process according to the embodiments. Such a program may be executed by a CPU 2012 to cause the computer 2000 to execute the specific operation associated with some or all of the blocks of processing procedures and block diagrams described in the present specification.

The computer 2000 according to the present embodiment includes the CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014, or the ROM 2026, and is executed by the CPU 2012. Information processing written in these programs is read by the computer 2000, resulting in cooperation between a program and the various types of hardware resources described above. A device or a method may be configured by implementing the operation or process of the information according to the use of the computer 2000.

For example, when a communication is executed between the computer 2000 and an external device, the CPU 2012 may execute a communication program loaded in the RAM 2014, and instruct the communication interface 2022 to process the communication based on the processing written in the communication program. Under the control of the CPU 2012, the communication interface 2022 reads transmission data stored in a transmission buffer region provided in a recording medium such as the RAM 2014 and the flash memory 2024, transmits the read transmission data to the network, or writes received data which is received from the network to a receiving buffer region or the like provided on the recording medium.

In addition, the CPU 2012 may cause all or a necessary portion of a file or a database to be read into the RAM 2014, the file or the database having been stored in the recording medium such as the flash memory 2024, etc., and perform various types of processing on the data on the RAM 2014. The CPU 2012 then writes back the processed data to the recording medium.

Various types of information, such as various types of programs, data, tables, and databases, may be stored in the recording medium to undergo information processing. The CPU 2012 may execute various types of processing on the data read from the RAM 2014 to write back a result to the RAM 2014, the processing being described in the present specification, specified by instruction sequences of the programs, and including various types of operations, information processing, condition determinations, conditional branching, unconditional branching, information retrievals/replacements, or the like. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module described above may be stored in a computer-readable storage medium on the computer 2000 or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

The program installed in the computer 2000 that causes the computer 2000 to function as the control system 200 may act on the CPU 2012 and the like and cause the computer 2000 to function as each unit of the control system 200, respectively. The information processing described in those programs are read by the computer 2000, thereby serving as each unit of the control system 200, which is specific means realized by the cooperation of software and the various types of hardware resources mentioned above.

Then, with these specific means, by realizing computing or processing of information according to an intended use of the computer 2000 in the present embodiment, the specific control system 200 is constructed according to the intended use.

Various embodiments have been described with reference to the block diagrams or the like. Blocks in the block diagrams may respectively represent (1) steps of processes in which operations are performed or (2) each unit of the apparatus responsible for performing operations. A specific step and each unit may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

The computer-readable storage medium may include any tangible device that can store instructions to be executed by a suitable device, and as a result, the computer-readable storage medium having the instructions stored thereon constitutes at least a part of an article of manufacture including instructions which can be executed to create means for performing operations specified in the processing procedures or block diagrams. Examples of computer-readable storage medium may include an electronic storage medium, a magnetic storage medium, an optical storage medium, an electromagnetic storage medium, a semiconductor storage medium, etc. Specific examples of the computer-readable storage medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions are executed to create means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: updating system,
20: vehicle,
32: communication cable,
34: diagnosis port
70: external apparatus,
74: reprogramming apparatus,
90: communication network,
200: control system,
201: TCU,
202: ECU,
204: ECU,
205: ECU,
206: ECU,
220: rewriting control unit,
230: power source information retrieving unit,
240: retrieving unit,
250: warning control unit,
280: in-vehicle communication line,
294: FI,
295: battery,
296: battery,
298: MID,
299: WI,
2000: computer,
2010: host controller,
2012: CPU,
2014: RAM,
2020: input/output controller,
2022: communication interface,
2024: flash memory,
2026: ROM,
2040: input/output chip

What is claimed is:

1. A program update control apparatus comprising:
at least one processor;
a rewriting control unit configured to perform, using the at least one processor, control over rewriting of a program executed by a mobile object control unit for controlling at least part of a mobile object with a new program;
a retrieving unit configured to retrieve, using the at least one processor, information related to the new program and a power amount required for the rewriting from an external apparatus; and
a power source information retrieving unit configured to retrieve, using the at least one processor, a remaining capacity of a battery of the mobile object used for the rewriting, wherein
the rewriting control unit is configured to start, using the at least one processor, the rewriting based on information related to a power amount required for the rewriting,
the power source information retrieving unit is configured to retrieve, using the at least one processor, a remaining capacity of the battery during the rewriting,
the rewriting control unit is configured to determine, using the at least one processor, whether to continue the rewriting based on a remaining capacity of the battery retrieved during execution of the rewriting by the power source information retrieving unit and a power amount required for the rewriting,
the mobile object control unit has a first storage area and a second storage area,
the mobile object control unit is configured to read, using the at least one processor, at a time of activation, either one of a program stored in the first storage area and a program stored in the second storage area,
the retrieving unit is configured to retrieve, using the at least one processor, from the external apparatus, a first program and a second program as the new program, as well as retrieve information indicating a power amount required for writing the first program and a power amount required for writing the second program, the rewriting control unit is configured to start, using the at least one processor, a writing of the first program to the second storage area in a case where the program executed by the mobile object control unit is stored in the first storage area, the power source information retrieving unit is configured to retrieve, using the at least one processor, a remaining capacity of the battery during the writing of the first program to the second storage area, and before a writing of the second program to the second storage area is started, and the rewriting control unit is configured to determine, using the at least one processor, whether to continue the rewriting based on the remaining capacity retrieved by the power source information retrieving unit during the writing of the first program to the second storage area and the power amount required for the writing of the second program.

2. The program update control apparatus according to claim 1, wherein the mobile object control unit has a first storage area and a second storage area, the mobile object control unit is configured to read, using the at least one processor, at a time of activation, either one of a program stored in the first storage area and a program stored in the second storage area, the rewriting control unit is configured to start, using the at least one processor, a writing of the new program to the second storage area in a case where the program executed by the mobile object control unit is stored in the first storage area, and the power source information retrieving unit is configured to notify, using the at least one processor, the rewriting control unit of the remaining capacity retrieved by the program stored in the first storage area during execution of the rewriting.

3. The program update control apparatus according to claim 1, wherein when a difference between the remaining capacity retrieved by the power source information retrieving unit during the writing of the first program to the second storage area and electrical power required for the writing of the second program is below a predetermined value, the rewriting control unit is configured to stop, using the at least one processor, the writing of the first program and configured not to start the writing of the second program.

4. The program update control apparatus according to claim 1, further comprising a warning control unit configured to output, using the at least one processor, a warning when a difference between the remaining capacity retrieved by the power source information retrieving unit during the writing of the first program to the second storage area and electrical power required for the writing of the second program is below a predetermined value.

5. A program update control apparatus comprising:
at least one processor;
a rewriting control unit configured to perform, using the at least one processor, control over rewriting of a program executed by a mobile object control unit for controlling at least part of a mobile object with a new program;

a retrieving unit configured to retrieve, using the at least one processor, information related to the new program and a power amount required for the rewriting from an external apparatus; and a power source information retrieving unit configured to retrieve, using the at least one processor, a remaining capacity of a battery of the mobile object used for the rewriting, wherein the rewriting control unit is configured to start, using the at least one processor, the rewriting based on information related to a power amount required for the rewriting, the power source information retrieving unit is configured to retrieve, using the at least one processor, a remaining capacity of the battery during the rewriting, the rewriting control unit is configured to determine, using the at least one processor, whether to continue the rewriting based on a remaining capacity of the battery retrieved during execution of the rewriting by the power source information retrieving unit and a power amount required for the rewriting, the mobile object control unit includes a single storage area configured to store a program executed by the mobile object control unit, the retrieving unit is configured to retrieve, using the at least one processor, from the external apparatus, a first program and a second program as the new program, as well as retrieve a power amount required for writing of the first program and a power amount required for writing of the second program, the rewriting control unit is configured to start, using the at least one processor, the writing of the first program to a storage area in which the program executed by the mobile object control unit is written, when the writing of the first program to the storage area is complete, the power source information retrieving unit is configured to retrieve, using the at least one processor, a remaining capacity of the battery before performing the writing of the second program to the storage area, and when a difference between the remaining capacity retrieved by the power source information retrieving unit before the writing of the second program to the storage area is performed and the power amount required for the writing of the second program is below a predetermined value, the rewriting control unit is configured to determine, using the at least one processor, not to start the writing of the second program.

6. A program update control apparatus comprising:
at least one processor;
a rewriting control unit configured to perform, using the at least one processor, control over rewriting of a program executed by a mobile object control unit for controlling at least part of a mobile object with a new program;

a retrieving unit configured to retrieve, using the at least one processor, information related to the new program and a power amount required for the rewriting from an external apparatus;

a power source information retrieving unit configured to retrieve, using the at least one processor, a remaining capacity of a battery of the mobile object used for the rewriting; and a warning control unit configured to output, using the at least one processor, a warning when a difference between the remaining capacity indicated by the information retrieved by the power source information retrieving unit and the power amount required for the rewriting retrieved by the retrieving unit is below a predetermined value, wherein the rewriting control unit is configured to start, using the at least one processor, the rewriting based on information related to a power amount required for the rewriting, the power source information retrieving unit is configured to retrieve, using the at least one processor, a remaining capacity of the battery during the rewriting, and the rewriting control unit is configured to determine, using the at least one processor, whether to continue the rewriting based on a remaining capacity of the battery retrieved during execution of the rewriting by the power source information retrieving unit and a power amount required for the rewriting.

7. The program update control apparatus according to claim 6, wherein the rewriting control unit is configured to start, using the at least one processor, the rewriting of the new program when a charger is connected to the battery after the warning has been output.

8. The program update control apparatus according to claim 1, wherein the mobile object is a vehicle.

9. The program update control apparatus according to claim 8, wherein after the retrieving unit has retrieved, from the external apparatus, information related to the new program and a power amount required for the rewriting, when an ignition power source of the mobile object is turned off, the rewriting control unit is configured to start, using the at least one processor, the rewriting based on information related to the power amount required for the rewriting, and the power source information retrieving unit is configured to retrieve, using the at least one processor, a remaining capacity of the battery during execution of the rewriting, and the rewriting control unit is configured to determine, using the at least one processor, whether to continue the rewriting based on the power amount required for the rewriting and the remaining capacity.

10. A program update control apparatus comprising:

at least one processor;

a rewriting control unit configured to perform, using the at least one processor, control over rewriting of a program executed by a mobile object control unit for controlling at least part of a mobile object with a new program;

a retrieving unit configured to retrieve, using the at least one processor, information related to the new program and a power amount required for the rewriting from an external apparatus; and a power source information retrieving unit configured to retrieve, using the at least one processor, a remaining capacity of a battery of the mobile object used for the rewriting, wherein the rewriting control unit is configured to start, using the at least one processor, the rewriting based on information related to a power amount required for the rewriting, the power source information retrieving unit is configured to retrieve, using the at least one processor, a remaining capacity of the battery during the rewriting, the rewriting control unit is configured to determine, using the at least one processor, whether to continue the rewriting based on a remaining capacity of the battery retrieved during execution of the rewriting by the power source information retrieving unit and a power amount required for the rewriting, the mobile object is a vehicle, and the battery is a battery that is different from a battery for supplying electrical power to a prime mover configured to generate power for running the vehicle.

11. The program update control apparatus according to claim 1, wherein the program update control apparatus is an external reprogramming apparatus that is in a wired connection with a communication path in the mobile object, and configured to control the rewriting of the program through the wired connection from an outside of the mobile object.

12. The program update control apparatus according to claim 2, wherein the mobile object control unit has a first storage area and a second storage area, the mobile object control unit is configured to read, using the at least one processor, at a time of activation, either one of a program stored in the first storage area and a program stored in the second storage area, the retrieving unit is configured to retrieve, using the at least one processor, from the external apparatus, a first program and a second program as the new program, as well as retrieve information indicating a power amount required for writing the first program and a power amount required for writing the second program, the rewriting control unit is configured to start, using the at least one processor, a writing of the first program to the second storage area in a case where the program executed by the mobile object control unit is stored in the first storage area, the power source information retrieving unit is configured to retrieve, using the at least one processor, a remaining capacity of the battery during the writing of the first program to the second storage area, and before a writing of the second program to the second storage area is started, and the rewriting control unit is configured to determine, using the at least one processor, whether to continue the rewriting based on the remaining capacity retrieved by the power source information retrieving unit during the writing of the first program to the second storage area and the power amount required for the writing of the second program.

13. The program update control apparatus according to claim 12, wherein when a difference between the remaining capacity retrieved by the power source information retrieving unit during the writing of the first program to the second storage area and electrical power required for the writing of the second program is below a predetermined value, the rewriting control unit is configured to stop, using the at least one processor, the writing of the first program and configured not to start the writing of the second program.

14. The program update control apparatus according to claim 12, further comprising a warning control unit configured to output, using the at least one processor, a warning when a difference between the remaining capacity retrieved by the power source information retrieving unit during the writing of the first program to the second storage area and electrical power required for the writing of the second program is below a predetermined value.

15. The program update control apparatus according to claim 2, further comprising
a warning control unit configured to output, using the at least one processor, a warning when a difference between the remaining capacity indicated by the information retrieved by the power source information retrieving unit and the power amount required for the rewriting retrieved by the retrieving unit is below a predetermined value.

16. The program update control apparatus according to claim 1, further comprising
a warning control unit configured to output, using the at least one processor, a warning when a difference between the remaining capacity indicated by the information retrieved by the power source information retrieving unit and the power amount required for the rewriting retrieved by the retrieving unit is below a predetermined value.

17. A mobile object comprising the program update control apparatus according to claim 1.

18. A program update control method for rewriting a program with a new program, the program update control method comprising:
retrieving, from an external apparatus, the new program for rewriting the program executed by a mobile object control unit configured to control at least part of a mobile object and information related to a power amount required for the rewriting, the mobile object control unit having a first storage area and a second storage area;
starting control over rewriting of the program executed by the mobile object control unit with the new program, based on the information related to the power amount required for the rewriting;
retrieving, during the rewriting, a remaining capacity of a battery that is used for the rewriting;
determining whether to continue the rewriting based on the remaining capacity of the battery retrieved during execution of the rewriting and the power amount required for the rewriting;
reading, at a time of activation, either one of a program stored in the first storage area and a program stored in the second storage area;
retrieving, from the external apparatus, a first program and a second program as the new program, as well as retrieving information indicating a power amount required for writing the first program and a power amount required for writing the second program;
starting a writing of the first program to the second storage area in a case where the program executed by the mobile object control unit is stored in the first storage area;
retrieving a remaining capacity of the battery during the writing of the first program to the second storage area, and before a writing of the second program to the second storage area is started; and
determining whether to continue the rewriting based on the retrieved remaining capacity during the writing of the first program to the second storage area and the power amount required for the writing of the second program.

19. A non-transitory computer-readable storage medium having stored thereon instructions for rewriting a program with a new program and causing a computer to execute operations including:
retrieving, from an external apparatus, the new program for rewriting the program executed by a mobile object control unit configured to control at least part of a mobile object and information related to a power amount required for the rewriting, the mobile object control unit having a first storage area and a second storage area;
starting control over rewriting of the program executed by the mobile object control unit with the new program, based on the information related to the power amount required for the rewriting;
retrieving, during the rewriting, a remaining capacity of a battery that is used for the rewriting;
determining whether to continue the rewriting based on the remaining capacity of the battery retrieved during execution of the rewriting and the power amount required for the rewriting;
reading, at a time of activation, either one of a program stored in the first storage area and a program stored in the second storage area;
retrieving, from the external apparatus, a first program and a second program as the new program, as well as retrieving information indicating a power amount required for writing the first program and a power amount required for writing the second program;
starting a writing of the first program to the second storage area in a case where the program executed by the mobile object control unit is stored in the first storage area;
retrieving a remaining capacity of the battery during the writing of the first program to the second storage area, and before a writing of the second program to the second storage area is started; and
determining whether to continue the rewriting based on the retrieved remaining capacity during the writing of the first program to the second storage area and the power amount required for the writing of the second program.

* * * * *